United States Patent [19]

Yamaguchi

[11] Patent Number: 5,110,534
[45] Date of Patent: May 5, 1992

[54] POWER SOURCE FOR NUCLEAR FUSION REACTOR

[75] Inventor: Satarou Yamaguchi, Tokyo, Japan

[73] Assignee: Mitsubishi Denki Kabushiki Kaisha, Japan

[21] Appl. No.: 420,729

[22] Filed: Oct. 11, 1989

Related U.S. Application Data

[63] Continuation of Ser. No. 828,879, Feb. 13, 1986, abandoned.

[30] Foreign Application Priority Data

Feb. 19, 1985 [JP] Japan ................. 60-29301

[51] Int. Cl.⁵ ............................................. G21B 1/00
[52] U.S. Cl. ........................................ 376/143; 320/1; 363/63
[58] Field of Search ............... 376/143, 100; 320/1; 363/63

[56] References Cited

U.S. PATENT DOCUMENTS

| | | | |
|---|---|---|---|
| 3,391,327 | 7/1968 | Pelly | 363/63 |
| 3,579,080 | 5/1971 | Vollrath | 363/63 |
| 3,713,011 | 1/1973 | Johnson et al. | 363/63 |
| 4,329,595 | 5/1982 | Watson | 320/1 |
| 4,573,006 | 2/1986 | Newton | 320/1 |

OTHER PUBLICATIONS

*Guidebook of Electronic Circuits*, McGraw-Hill Book Co., 1974, Markus, pp. 713-715, 723.
Repute-1, Annual Review 1984, Faculty of Engineering & Faculty of Science, University of Tokyo, Miyamoto et al.
Thullen et al., "ZT-40U:Conceptual Design of a 2MA Reversed Field Pinch Experiment", LA-UR-83-1375, 1983, Los Alamos National Lab.
EUR-CNR, EUR-UKAEA Association, "The RFX Experiment Technical Proposal", Application from Euratom Preferential Support Phase III, Mar. 1982.

*Primary Examiner*—Harvey E. Behrend
*Attorney, Agent, or Firm*—Leydig, Voit & Mayer

[57] ABSTRACT

This invention relates to a power source for a nuclear fusion reactor for flowing a current to a load coil (e.g., a toroidal coil) provided in the nuclear fusion reactor such as a reversed field pinch apparatus comprising a bias power supply for supplying a current of a first direction to the load coil, and a reversed magnetic field power supply for supplying a current of a second direction reverse to the first direction to the load coil and having a circuit for holding the reverse current for a predetermined period of time, said bias power supply including a series circuit of a capacitor, a unidirectional element having a switching function and an inductor and connected in parallel with the load coil, thereby removing a clover element from the bias power supply.

More particularly, according to this invention, when a current is flowed from the reversed magnetic power supply to the load coil, a current from the reversed magnetic power supply to the inductor in the bias power supply is stopped.

4 Claims, 5 Drawing Sheets

POWER SOURCE FOR NUCLEAR FUSION REACTOR

This application is a continuation of application Ser. No. 06/828,879, filed Feb. 13, 1986, now abandoned.

BACKGROUND OF THE INVENTION

This invention relates to a power source for a nuclear fusion reactor and, more particularly, to a power source adapted to remove a clover element from a bias power supply and to prevent a current from a reversed magnetic field power supply from flowing to the bias power supply side in a nuclear fusion reactor.

FIG. 5 exemplifies a schematic construction of a prior-art power source for a nuclear fusion reactor of this type. In FIG. 5, reference numeral 1 designates a bias power supply in which a capacitor $C_B$ 11 and a diode $D_B$ 14 of a clover element are connected in parallel, one connecting terminal of this parallel circuit is connected through a series circuit of a switch SW1 (12) and an inductor $L_D$ 13 to one end of a toroidal coil $L_T$ 15 of a load coil, and the other connecting terminal of the parallel circuit is connected directly to the other end of the toroidal coil $L_T$ 15. Then, reference numeral 2 designates a reversed magnetic field power supply in which a capacitor $C_r$ 21 and a PFN (Pulse Forming Network) circuit 3 to be described in detail later are connected in parallel through a diode $D_p$ 23, and the reversed magnetic field power supply 2 is connected through a switch SW2 22 in parallel with the toroidal coil $L_T$ 15. The PFN circuit 3 is provided to maintain a reversed magnetic field, and has a predetermined number of parallel capacitors $C_p$ 31 and a plurality of inductors $L_p$ 32 for connecting the capacitors $C_p$ 31 therebetween. The capacitors $C_B$ 11 included in the bias power supply 1 and the capacitor $C_r$ 21 included in the reversed magnetic field power supply 2 are charged in reverse polarity to each other. FIG. 6 exemplifies a waveform of a current flowed to the toroidal coil $L_T$ 15 and the inductor $L_D$ 13 in the prior-art power source.

The operation of the prior-art power source thus constructed as described above will be described. The capacitor $C_B$ 11 in the bias power supply 1, the capacitor $C_r$ 21 in the reversed magnetic field power supply 2 and the capacitor $C_p$ 31 in the PFN circuit 3 are first charged in the polarity exemplified in FIG. 5. The switch SW1 12 is then closed to start discharging the capacitor $C_B$ 11 through the inductor $L_D$ 13 and the toroidal coil $L_T$ 15. At this time, the current $I_2$ flowed to the inductor $L_D$ 13 is equal to the current $I_1$ flowed to the toroidal coil $L_T$ 15. This state is continued from the discharge starting time point $t=t_0$ to the reverse starting time point $t=t_1$, thereby generating a bias magnetic field of forward direction in the toroidal coil $L_T$ 15. The switch SW2 22 in the reversed magnetic field power supply 2 is closed at the reverse starting time point $t=t_1$. Thus, a current reverse to that flowed so far starts flowing from the capacitor $C_r$ 21 in the reversed magnetic field power supply 2 to the toroidal coil $L_T$ 15. The current $I_1$ flowed to the toroidal coil $L_T$ 15 abruptly decreases to cause the polarity to be reversed. Simultaneously, the current from the capacitor $C_r$ 21 is flowed through the diode $D_B$ 14 to the inductor $L_D$ 13 to cause the current to increase.

With respect to a plasma, a plasma current abruptly increases at the reverse starting time point $t=t_1$, and a plasma of high temperature and high density has been generated at this time. For example, in order to enclose the plasma of high temperature and high density in a reversed field pinch apparatus, since the toroidal coil included in the pinch apparatus must maintain a substantially constant reversed magnetic field, a substantially constant reverse current from the PFN circuit 3 must be flowed to the toroidal coil $L_T$ 15. Thus, though the plasma is enclosed within a period of time from the reverse completion time point $t=t_2$ to the main discharge finishing time point $t=t_3$, the current from the PFN circuit 3 flows to both the toroidal coil $L_T$ 15 and the inductor $L_D$ 13. The inductor $L_D$ 13 is provided to eliminate the abrupt charge of the capacitor $C_B$ 11 in the bias power supply 1 due to the discharge of the capacitor $C_r$ 21 in the reversed magnetic field power supply 2 and ordinarily selected and used to the value of $L_D \cong (0.5-4) \times L_T$. The bias magnetic field is several KG to 10 KG, and the reversed magnetic field is approx. $-1.0$ KG.

In the prior-art power source of this type, the inductor $L_D$ 13 in the bias power supply is excited in addition to the excitation of the toroidal coil $L_T$ 15 as described above. Thus, since the current flowed to the latter is much larger than the current flowed to the former, such a problem arises that the PFN circuit 3 and the capacitor $C_r$ 21 in the reversed magnetic field power supply 2 used for the current must be in large scale. It is further difficult to equalize the time constants of the toroidal coil $L_T$ 15 and the inductor $L_D$ 13. The current flowed to the former is remarkably affected by the influence of the current flowed to the latter to arise a difficulty to flow a constant current. Thus, a ripple as shown by $\Delta I_1$ exemplified in FIG. 6 occurs, with the result that a problem arises that the plasma enclosing characteristic is deteriorated.

SUMMARY OF THE INVENTION

This invention has been made in order to eliminate the disadvantages of the prior art as mentioned above, and has for its object to provide a power source for a nuclear fusion reactor in which electric energy for a reversed magnetic field power supply can be saved, a reverse current flowed to a toroidal coil can be maintained constant to improve the plasma enclosure of a reversed field pinch.

More specifically, a power source for a nuclear fusion reactor according to this invention for flowing a current to a load coil (e.g., a toroidal coil) provided in the nuclear fusion reactor such as a reversed field pinch apparatus comprises a bias power supply for supplying a current of a first direction to the load coil, and a reversed magnetic field power supply for supplying a current of a second direction reverse to the first direction to the load coil and having a circuit for holding the reverse current for a predetermined period of time, said bias power supply including a series circuit of a capacitor, a unidirectional element having a switching function and an inductor and connected in parallel with the load coil, thereby removing a clover element from the bias power supply.

BRIEF DESCRIPTION OF THE DRAWINGS

In the drawings, the same symbols indicate the same or corresponding parts.

DESCRIPTION OF THE PREFERRED EMBODIMENTS

Figure 1:
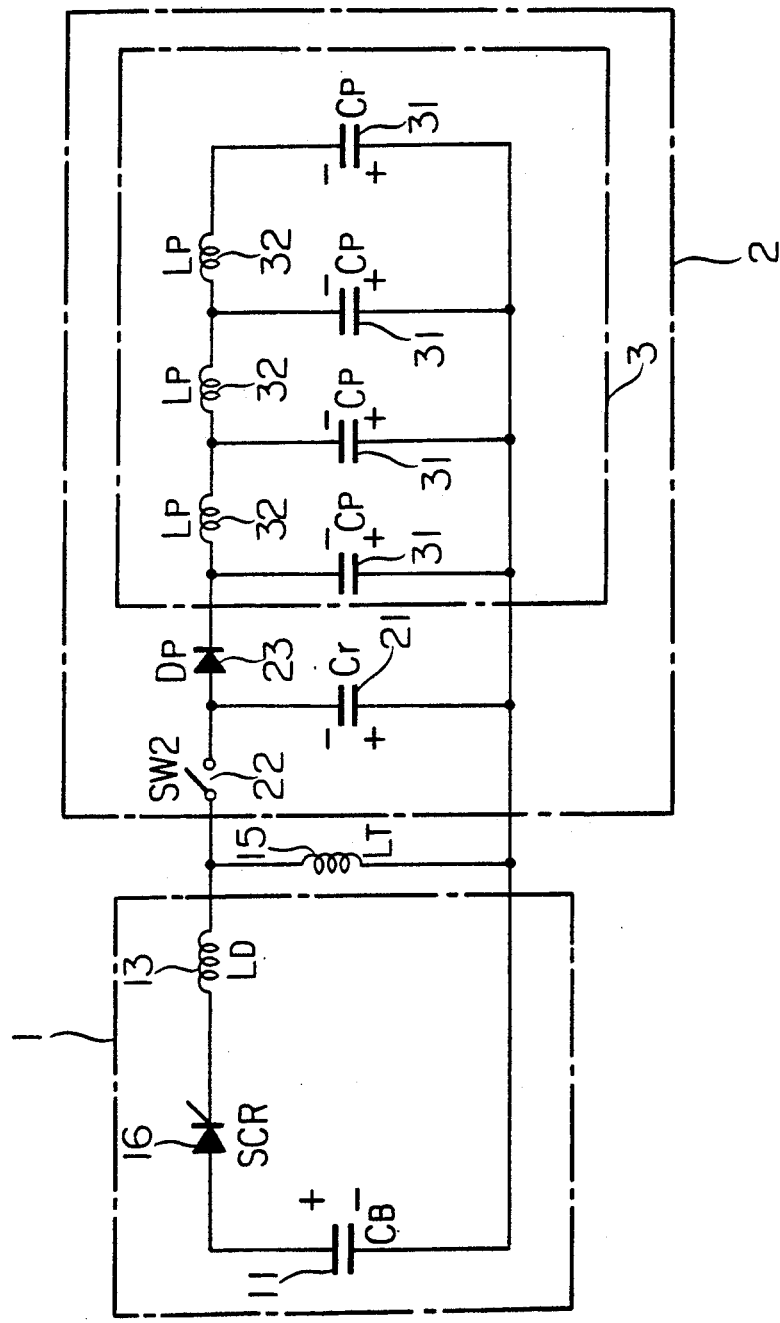
FIG. 1 is a schematic view showing the construction of a power source for a nuclear fusion reactor according to an embodiment of this invention.
Figure 2:
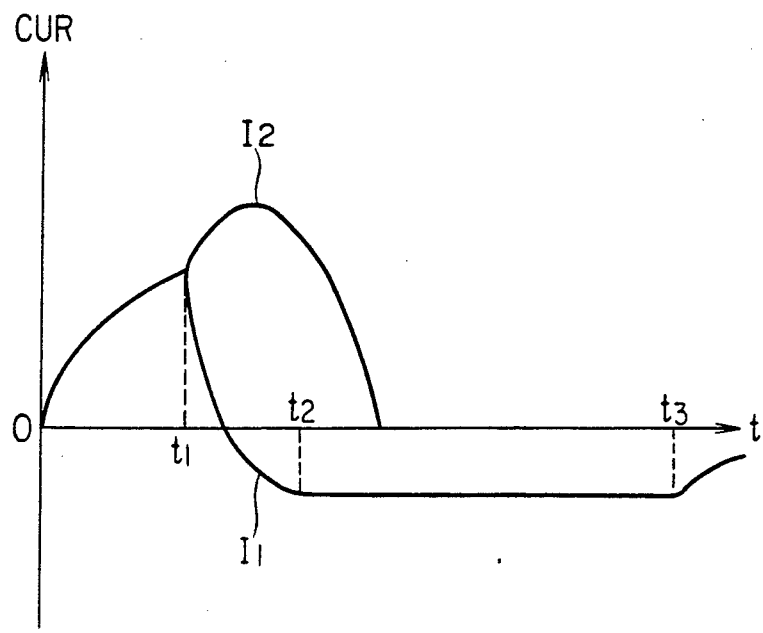
FIG. 2 is a diagram showing the waveforms of currents in the above-mentioned embodiment.
Figure 5:
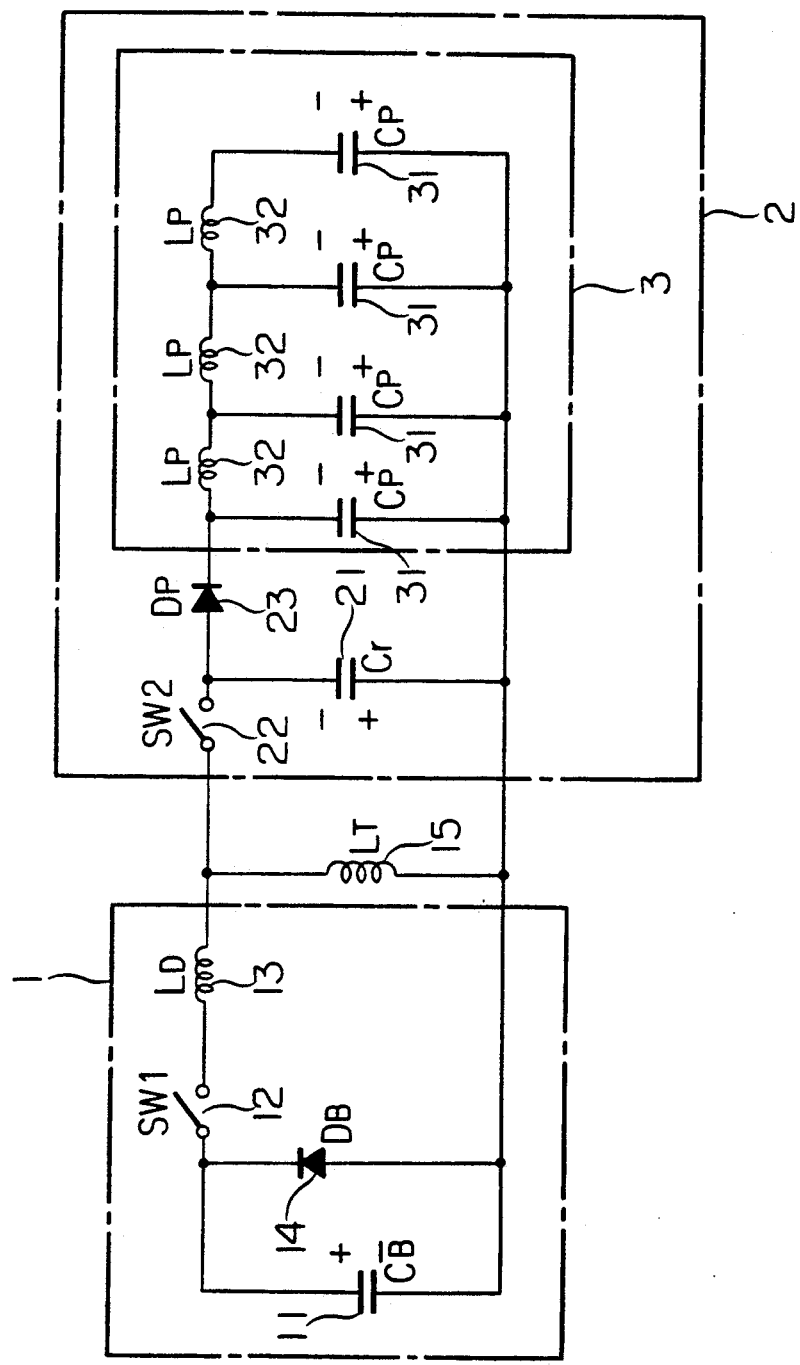
FIG. 5 is a schematic view showing the construction of a prior-art power source.

FIG. 1 is a schematic view showing a power source for a nuclear fusion reactor according to an embodiment of this invention, and FIG. 2 is a diagram exemplifying the waveforms of currents flowed to a toroidal coil $L_T$ 15 and an inductor $L_D$ 13 in the embodiment of the power source of the invention. In FIG. 1, a bias power supply 1 has a series circuit of a capacitor $C_B$ 11, a thyristor SCR 16 and an inductor $L_D$ 13, and is connected in parallel with a toroidal coil $L_T$ 15. A reversed magnetic field power source 2 and a PFN circuit 3 are constructed in the same manner as those of the prior-art power source in FIG. 5.

The operation of the embodiment of the power source according to this invention described above will be described. The capacitor $C_B$ 11 in the bias power supply 1, the capacitor $C_r$ 21 in the reversed magnetic field power supply 2 and the capacitor $C_p$ 31 in the PFN circuit 3 are first charged in the polarity exemplified in FIG. 1. Then, a predetermined firing pulse is applied to the gate of the thyristor SCR 16 to fire the thyristor SCR 16, thereby starting discharging to the toroidal coil $L_T$ 15 A switch SW2 22 is closed at a time point $t=t_1$ in FIG. 2, and a current of reverse direction to that flowed so far starts flowing from the capacitor $C_r$ 21 in the reversed magnetic field power source 2, but no current flowed through the inductor $L_D$ 13 flows. Since the firing pulse is not applied to the thyristor SCR 16 when the current passing through the inductor $L_D$ 13 becomes zero at a time point $t=t_4$, the thyristor SCR 16 is extinguished, a circuit of the SCR 16, the $L_D$ 13, the $L_T$ 15 and the $C_B$ 11 is opened, and electrically disconnected. The reverse operation of the magnetic field at a time point $t=t_2$ is completed, the current flowed to the toroidal coil $L_T$ 15 at the time point is held by the PFN circuit 3 to the time point $t=t_3$, and a plasma is enclosed.

According to the embodiment of the power source in accordance of this invention as described above, the circuit which includes the inductor $L_D$ 13 in the bias power supply 1 is adapted to be opened, the current flowed to the toroidal coil $L_T$ 15 is not thus affected by the influence of the current flowed to the inductor $L_D$ 13, and a current of the waveform having no ripple as shown by the waveform of the current $I_1$ in FIG. 2 can be attained.

Figure 3:
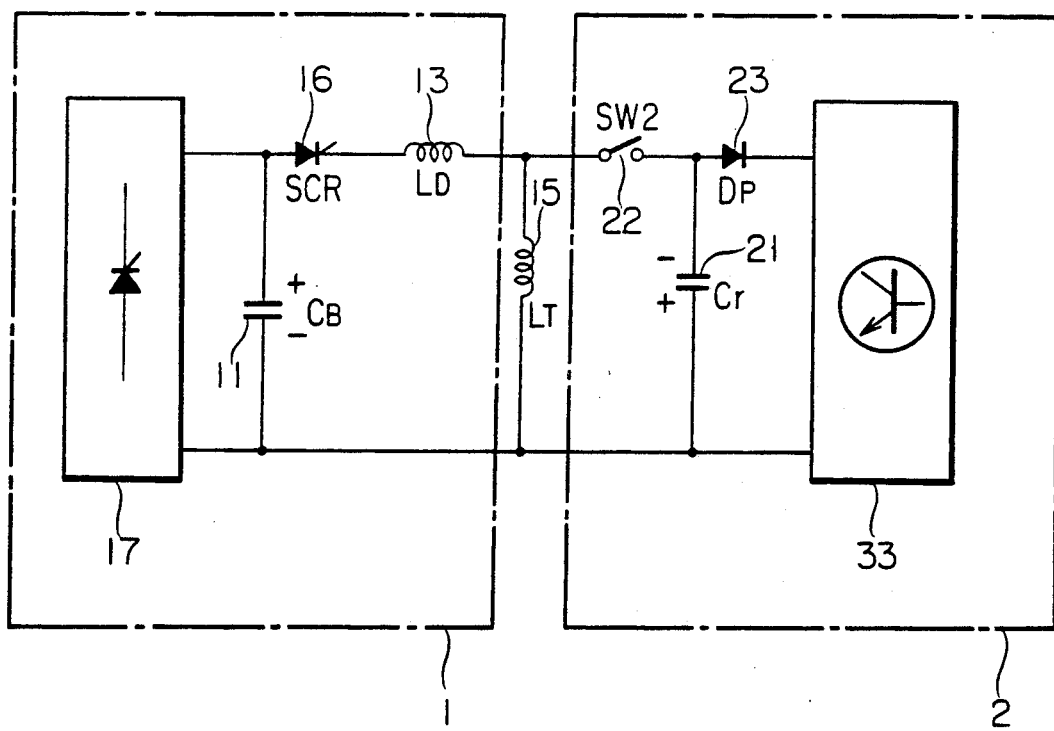
FIG. 3 is a schematic view showing a power source for a nuclear fusion reactor according to a second embodiment of this invention.
Figure 4:
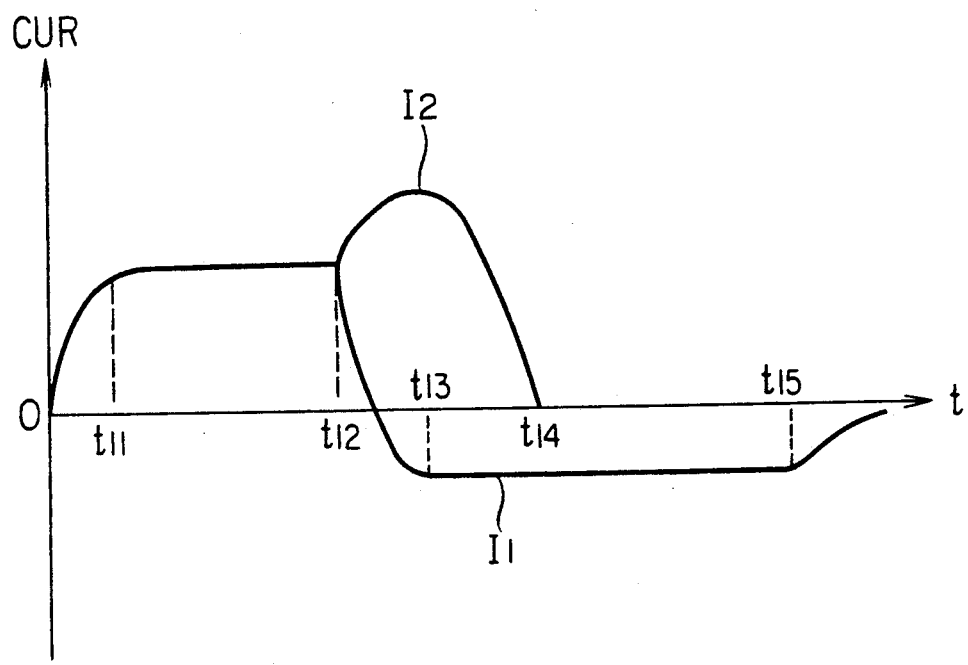
FIG. 4 is a diagram showing the waveforms of currents in the second embodiment.
Figure 6:
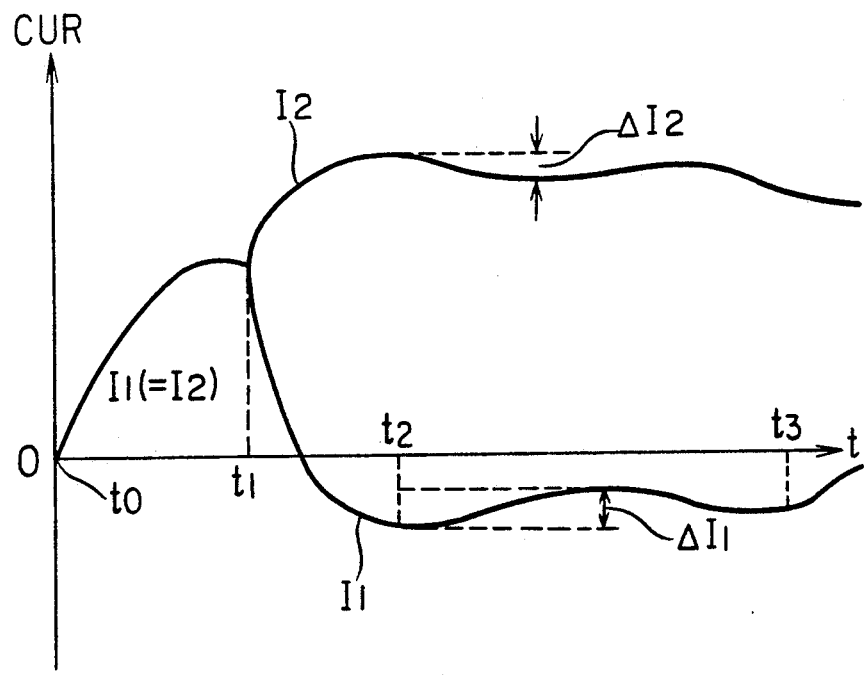
FIG. 6 is a diagram showing the waveforms of currents in the prior-art power source.

FIG. 3 is a schematic view showing a second embodiment of a power source for a nuclear fusion reactor according to this invention. In FIG. 3, a thyristor power supply 17 is connected in parallel with a capacitor $C_B$ in the power source in FIG. 1, and a transistor power supply 33 is replaced by the PFN circuit 3 in FIG. 1. The thyristor power supply means a rectifier circuit in which thyristors are connected in a bridge widely known per se, an a.c. side input terminal is connected to an a.c. power source, and a d.c. output terminal is connected with the capacitor $C_B$ 11. The transistor power supply 33 is a power supply circuit in which transistors are connected in series and in parallel widely known in general. FIG. 4 is a diagram showing the waveforms of currents in the second embodiment of the power source of this invention in FIG. 3. In FIG. 4, $t_{11}$ is a bias rising time point, $t_{12}$ is a reverse starting time point, $t_{13}$ is a reverse completion time point, $t_{14}$ is a breaking time point of a current to the inductor $L_D$ 13, and $t_{15}$ is a discharge finishing time point.

Figure 1A:
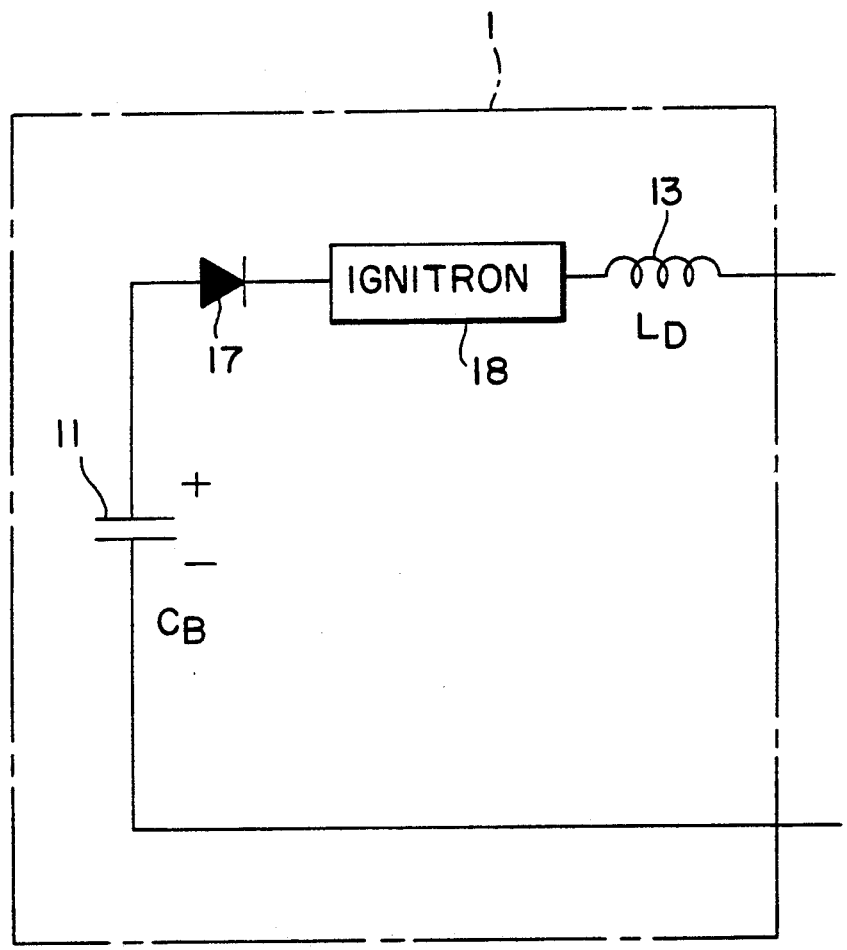
FIG. 1A is a modified bias power supply.

In the second embodiment of the power source of this invention, the thyristor power supply 17 is employed in the bias power supply 1. Therefore, the current can be maintained flat over a period from the time point $t_{11}$ to the time point $t_{12}$. In this case, when the reverse magnetic field is applied, since the current flowed to the toroidal coil $L_T$ 15 is not affected by the influence of the current from the bias power supply 1 side over a period from the time point $t_{13}$ to the time point $t_{15}$, a flat current having no ripple can be flowed to the coil. In the embodiments described above, a series circuit of a diode 17 and an ignitron 18 may be employed instead of the thyristor SCR 16, as shown in FIG. 1A.

According to this invention as described above, a clover element is removed from the bias power supply and the thyristor or the diode is connected in series with the inductor in the bias power supply in the power source for the nuclear fusion reactor. Therefore, since a current flowed from the reversed magnetic field power supply side to the bias power supply side can be prevented, the capacity of the power supply can be reduced. Since the both power supplies can be independently operated, the power supplied do not interfere from each other, a flat reverse current having no ripple can be flowed to the toroidal coil, thereby improving the reversed field pinch plasma enclosure.

What is claimed is:

1. In a nuclear fusion reactor having a load coil, a power source for supplying a current to the load coil, the power source comprising:

a biased power supply means, coupled to the load coil, for supplying a current in a first direction to the load coil and a reverse magnetic field power supply means coupled to the load coil, for supplying a reverse current of a second direction opposite to the first direction to the load coil and having a circuit for holding the reverse current for a predetermined period of time, wherein said biased power supply means includes means for maintaining a constant reverse current without a ripple through the load coil, said constant current maintaining means including a series circuit of a first capacitor, a unidirectional element having a switching function, and an inductor and connected in parallel with load coil, said biased power supply means further including a thyristor power supply connected in parallel with said capacitor, and wherein said reversed magnetic field power supply means includes a series circuit of a switch and a second capacitor connected in parallel with the load coil and a series circuit of a diode and a transistor power supply connected in parallel with said second capacitor.

2. A power source according to claim 1, wherein said unidirectional element is a thyristor.

3. A power source according to claim 1, wherein said unidirectional element is a series circuit of a diode and an ignitron.

4. In a nuclear fusion reactor having a load coil, a power source for supplying a current to the load coil comprising:
- a biased power supply coupled to the load coil for supplying a current in a first direction to the load coil and
- a reversed magnetic field supply coupled to the load coil for supplying a reverse current in a second direction opposite to the first direction to the load coil and having a circuit for holding the reverse circuit for a predetermined period of time, wherein said biased power supply includes a series circuit of a first capacitor, a unidirectional element having a switching function, and an inductor and so arranged and connected in parallel with the load coil as to maintain a constant reverse current without a ripple to the load coil, said biasing power supply means further including a thyristor power supply connected in parallel with the first capacitor, and wherein said reverse magnetic field supply includes a series circuit of a switch and a second capacitor connected in parallel with the load coil and a series circuit of a diode and a transistor power supply connected in parallel with the second capacitor.

* * * * *